Nov. 14, 1961 W. J. RUDDEN 3,008,685
BUTTERFLY VALVE
Filed July 7, 1955
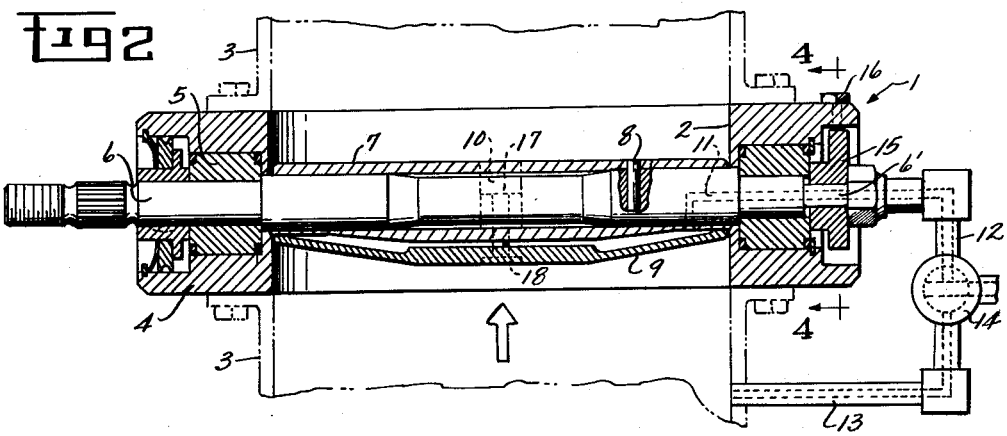
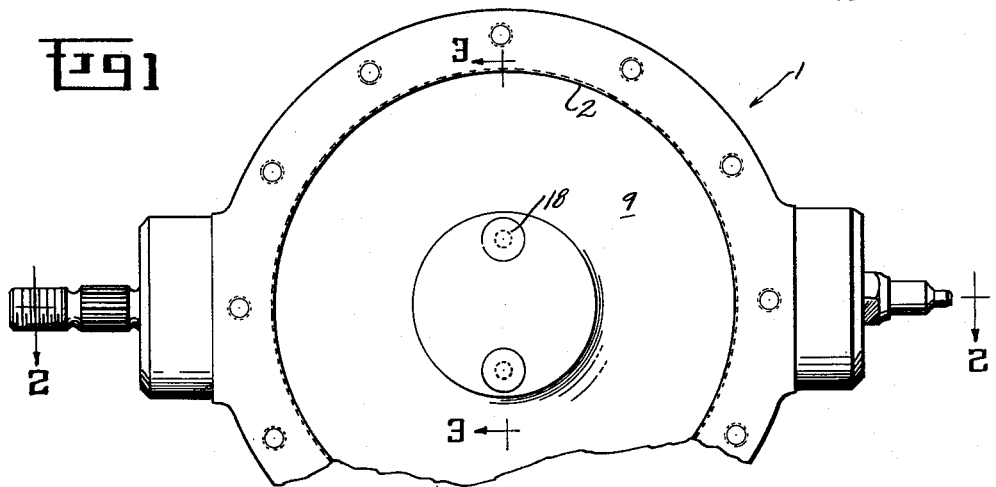
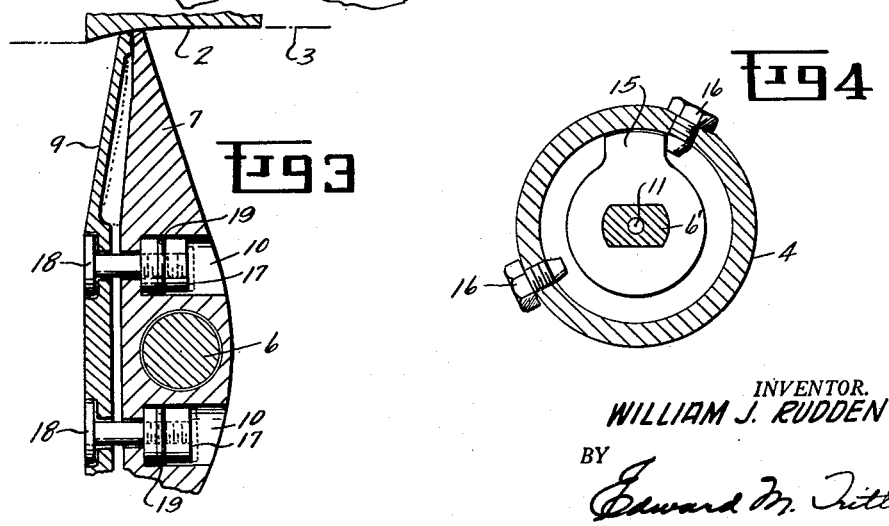
INVENTOR.
WILLIAM J. RUDDEN
BY
HIS ATTORNEY

United States Patent Office 3,008,685
Patented Nov. 14, 1961

3,008,685
BUTTERFLY VALVE
William J. Rudden, Manchester, Mass., assignor to General Electric Company, a corporation of New York
Filed July 7, 1955, Ser. No. 520,491
6 Claims. (Cl. 251—160)

This invention relates to butterfly valves and, more particularly to an improved sealing means for a butterfly valve.

Valves of the type known as butterfly valves commonly employ a disk shaped member which is rigidly attached to a rotatably mounted stem extending across the bore of a fluid conduit for the purpose of regulating flow in the conduit by rotating the disk therein so as to vary the restriction in the conduit and thereby obtain greater or lesser flow. The valve disk is ordinarily designed to engage the walls of the conduit when the valve is in the closed position so as to completely cut off the flow of fluid within the conduit. Considerable difficulty has been experienced in maintaining the effectiveness of such valves in the closed position due to a poor fit between sealing member and the conduit wall, which results from manufacturing tolerances, misalignment caused by deflection of the shaft under pressure, temperature differences, dirt, excessive wear, distortion under extreme hot or cold conditions, and excessive erosion in the valve wall. In order to improve the sealing characteristics of the periphery of the valve disk against the conduit walls, one practice has been to provide the valve disk with peripherial grooves and insert a ring member in each groove which is biased toward the conduit wall so as to obtain a tight seal joint in the conduit when the butterfly valve is closed. One of the disadvantages of this construction is that in order to obtain a good seal it is necessary to bias the ring member rather forcibly against the conduit wall so as to prevent fluid pressure from working between the ring and wall. Under these circumstances, the valve is difficult to operate due to sticking, and the ring member is subject to distortion under these conditions. In this type of arrangement there is also a certain amount of circumferential sliding of the sealing member with respect to the conduit wall which results in excessive resistance to the opening or closing of the valve.

An object of the invention is to provide an improved butterfly valve with a novel sealing arrangement which obviates these difficulties.

Another object of the invention is to provide a sealing arrangement for a valve which minimizes leakage and also minimizes the required opening torque.

A further object of the invention is to eliminate circumferential sliding of the sealing member with respect to the conduit wall thereby reducing wear and resistance to the turning of the valve.

Briefly stated, these and other objects may be accomplished by providing a resilient sealing diaphragm which is carried by the valve disk and deformed by externally applied pressure forces to provide sealing engagement with the valve casing walls.

The invention will be better understood from the following description taken in connection with the accompanying drawing in which FIG. 1 is an end view taken in elevation of a butterfly valve embodying the invention;

FIG. 2 is a cross-section view taken along the lines of 2—2 of FIG. 1;

FIG. 3 is an enlarged sectional view taken along the lines 3—3 of FIG. 1; and

FIG. 4 is an enlarged sectional view of a control shaft arrangement taken along the lines 4—4 of FIG. 2.

Referring to the drawing, the valve comprises a casing generally indicated at 1 having an internal bore portion 2 which is in alignment with the inner walls of a fluid conduit 3 when the valve is installed. The casing 1 is provided with two bushing portions 4 in which bearings 5 are mounted. The bearings 5 provide a rotatable support for a valve stem 6 having a portion journalled therein. The rotation of the valve stem 6 is limited by means of a stop arrangement which includes a cam member 15 which is keyed to the shaft 6 at 6′ and two bolts 16 which act as stops for the cam member 15. This arrangement is best illustrated in FIG. 4. The valve stem 6 extends across the internal bore portion 2 of the valve casing 1 and carries a valve disk 7 which is rigidly fastened to it by split taper pins 8 or any other suitable fastening means. The internal bore portion 2 has a spherical seat portion which is best seen in FIG. 3 and facilitates closure of the valve without interference. The improved sealing means for the valve thus described comprise a dish-shaped or cupular sealing member 9 which is mounted on the upstream side of the valve disk 7 as shown in FIG. 3. The dish-shaped member is contoured to provide a space between it and the valve disk 7 except at their peripheries where the two make sealing contact. The two are held firmly against one another by studs 18. The studs 18 are threaded to receive a shank portion 17 which is tightened down during assembly to provide sufficient force to provide a fluid seal between the disk 7 and sealing member 9. The stud 18 and shank portion 17 ride in openings 10 in the valve disk 7 which allow relative movement therebetween.

There is sufficient clearance between the studs 18 and the openings in the sealing member 9 to allow a limited degree of radial motion so that the sealing member is allowed to center itself in the valve casing when the valve is in its closed position. An O ring or any common type of fluid seal 19 is carried by the shank 17 to prevent leakage between the downstream side of the valve disk 7 and the space between the sealing member 9 and the valve disk 7. The sealing member 9 is made from a highly flexible material such as titanium or spring steel so as to be readily deformable when pressure is applied to it. Titanium has been found particularly suitable for this purpose since it has a low modulus of elasticity and high resistance to corrosion.

In order to control the fluid pressure in the space between the flexible sealing disk 9 and the valve disk 7, a fluid passage 11 is provided in the stem 6 which provides fluid communication between this space and a fluid conduit 12 which is connected to it through an elbow fitting having a bearing surface to permit rotation of the one end of the stem 6 therein. The conduit 12 is connected to a three position valve 14 of any common design which may be positioned to selectively provide fluid communication with the surrounding atmosphere, a fluid conduit 13 or to block the end of the conduit 12. The conduit 13 provides fluid communication between the valve 14 and fluid in the conduit 3 upstream from the valve disk 7. It should be noted that although one of the positions of the valve 14 is shown in the drawing as providing fluid communication between the space between the valve disk 7 and sealing member and atmosphere, it is not necessary to the practice of the invention that communication be made with the atmosphere. Communication with the interior of the conduit 3 downstream from the valve or any source of fluid of a pressure different from that in the conduit 3 upstream from the valve 3 will serve equally as well in practicing the invention.

With the apparatus thus described the operation is as follows. The valve is closed and the bore effectively sealed against flow of fluid when the valve disk is perpendicular to the axis of the bore 2 with the sealing member 9 facing the pressure side of the valve, that is, facing the direction of fluid flow as indicated by the arrow in FIG. 2. In order to effectuate sealing, when the valve is thus positioned, the valve 14 is turned to the position indicated in FIG. 2 thus venting the space between the sealing disk 9 and valve disk 7 to atmosphere. Under these conditions, the pressure of fluid in the conduit 3 upstream from the valve will create a pressure differential across the sealing member 9 which creates a force on the sealing member 9 in a direction towards the valve disk 7. This force results in the sealing member 9 being deformed as indicated by the broken lines in FIG. 3 so that the periphery of the sealing disk moves radially outward to make tight sealing contact with the inner bore 2 of the valve casing 1.

When it is desired to break the sealing engagement preparatory to rotating the valve disk to the open position, the pilot valve 14 is merely moved to the position indicated by the broken lines so that fluid communication is established between the inner bore portion of the conduit 3 and the space between the sealing member 9 and valve disk 7 so that the pressure differential across the sealing disk is eliminated. When the pressure differential across the sealing disk 9 is eliminated so that the sealing disk resumes its original shape, its perimeter is drawn radially inward breaking the sealing contact between it and the inner bore 2 of the valve casing 1.

Thus an arrangement is provided which permits sealing contact between a sealing member associated with a valve disk and the valve casing to be controlled externally.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. In a butterfly valve, the combination comprising a casing having a cylindrical bore, a rotatable valve stem extending across the bore, a valve disk attached to said stem and positioned in the bore, a dish-shaped flexible sealing member substantially the same diameter as said disk and mounted on the upstream side of the disk to make slidable sealing contact with said disk at their outer peripheries so as to form a fluid-tight chamber therebetween, means for connecting said fluid tight chamber to a fluid pressure level of a different magnitude from the pressure of the fluid upstream of said valve when said valve is in the closed position to create a pressure differential across said sealing member, said pressure differential causing said sealing member to deform whereby its periphery moves radially outward into sealing engagement with said bore, and means for connecting said fluid chamber to a second fluid pressure level to cause said sealing member to move out of engagement with said bore.

2. A butterfly valve comprising the combination of a casing having a cylindrical bore, a valve disk extending across said bore and rotatably mounted therein, said valve disk having a flexible and resilient dish-shaped sealing member of substantially the same diameter as said cylindrical bore mounted on its upstream side so as to form a fluid tight chamber therebetween, and means to vent said fluid-tight chamber when said valve disk is in its closed position so that a pressure differential is created across said sealing member causing it to deform whereby its periphery moves radially outward into sealing engagement with said bore.

3. A butterfly valve for controlling the flow of a fluid in a conduit having, in combination, a casing with a passage therethrough, a rotatable operating element extending into and transversely of said passage, a disk member mounted on said element within said passage for controlling the flow of fluid therethrough, a dish-shaped sealing member of substantially the same diameter as said disk member and adapted to make circumferential sliding sealing contact with said disk member at a radius near their peripheries to provide a fluid-tight chamber therebetween, fastening means for holding said disk member and said sealing member in sealing contact with one another, and fluid conduit means comprising means for providing fluid communication between said fluid tight chamber and atmosphere when said valve is in the closed position to create a pressure differential across said sealing member causing it to deform whereby its periphery moves radially outward into sealing engagement with said passage, and means for providing fluid communication between said fluid tight chamber and said fluid at a point upstream from said valve disk to eliminate said pressure differential and remove said sealing member from sealing engagement with said passage.

4. In a butterfly valve comprising a casing having a passage therethrough, a rotative element extending into and transversely of the passage, a control member conforming substantially to the cross section of the passage and attached to said element, a flexible and resilient sealing member having a periphery conforming substantially to that of said control member and a concave surface, fastening means for holding said sealing member in sliding relation against said control member with the concave surface of said sealing member adjacent the upstream side of said control member so as to form a fluid-tight chamber therebetween, and valve means movable between at least two positions, one of said positions providing fluid communication between said fluid tight chamber and atmosphere to create a pressure differential across said sealing member causing it to deform whereby its periphery moves radially outward into sealing engagement with said passage, the other of said positions providing fluid communication between said fluid tight chamber and a source of pressurized fluid to remove said sealing member from sealing engagement with said passage.

5. In a valve, a body forming a fluid-conducting bore; a flexible concavo-convex valve element having a contour conforming substantially to the cross-sectional shape of said bore; and means relatively loosely supporting said valve element for movement in said bore between open and closed positions, said loose support rendering said element self-centering, said means supporting said valve element when the latter is in a closed position with the convex side thereof exposed to fluid pressure, whereby said pressure tends to flatten said element and move the peripheral edge thereof into sealing engagement with the wall of said bore.

6. In a valve, a body forming a fluid-conducting bore; a flexible concavo-convex valve element having a contour conforming substantially to the cross-sectional shape of said bore; and supporting means engaging said valve element on the concave side between the center and periphery thereof, said supporting means providing for movement of said valve element in said bore between open and closed positions, fluid pressure applied to the convex side of said valve element in the closed position serving to flex such element toward a flat condition and move the peripheral edge thereof into sealing engagement with the wall of said bore.

References Cited in the file of this patent

UNITED STATES PATENTS

| 1,834,870 | Rogers | Dec. 1, 1931 |
| 2,054,064 | Anderson | Sept. 15, 1936 |
| 2,707,614 | Saar | May 3, 1955 |
| 2,727,471 | Martin | Dec. 20, 1955 |
| 2,740,605 | Schwenk | Apr. 3, 1956 |

FOREIGN PATENTS

| 724,308 | Germany | Aug. 22, 1942 |